July 7, 1925.

A. GIACOBI

FAIR GAME

Filed Nov. 8, 1924

1,545,421

Inventor:
Ange Giacobi,
by H. B. Willson & Co
Attorneys

Patented July 7, 1925.

1,545,421

UNITED STATES PATENT OFFICE.

ANGE GIACOBI, OF PARIS, FRANCE.

FAIR GAME.

Application filed November 8, 1924. Serial No. 748,633.

*To all whom it may concern:*

Be it known that I, ANGE GIACOBI, a citizen of the Republic of France, and residing at Paris, Seine Department, No. 30 Rue Coquilliere, in the Republic of France, industrial, have invented certain new and useful Improvements in Fair Games, of which the following is a specification.

The present invention relates to a game or attraction adapted to be installed in shooting galleries at fairs, in amusement grounds or the like, which is characterized by the fact that when the shooter makes a bull's-eye, the lens of a camera will be uncovered and the latter will be automatically operated in order to take a photograph of the shooter.

For this purpose the centre of the target is connected to a ratchet device so that when struck by the projectile, the mechanism will release a sliding plate behind which the camera lens is disposed; the movement of the said plate effects the ignition of a charge of magnesium powder by the production of an electric spark or by like means, and it also sets off the shutter of the camera lens.

The appended drawings which are given by way of example show an embodiment of the said invention.

Figure 3:
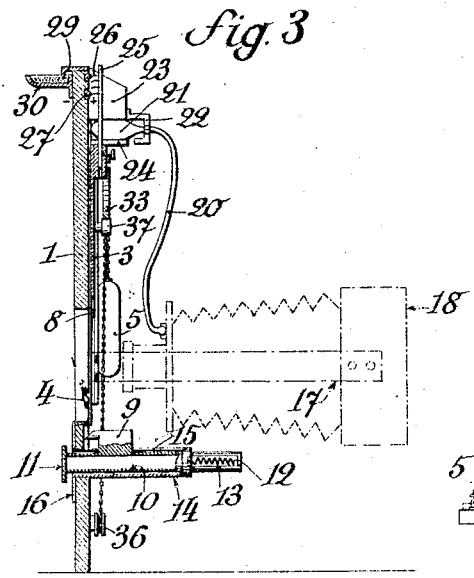
Fig. 3 is a vertical section on the line A—A of Fig. 1.
Figure 4:
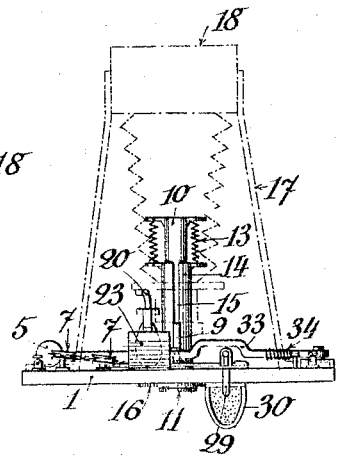
Fig. 4 is a plan view.

Upon the board or base 1 and in the rear with reference to the shooter are mounted two guides 2 having slidable therein a sheet metal plate 3 adapted to close the aperture 4 in the said board; the said sliding plate is subjected to the action of a counterweight 5 which is attached by the chain 6 to the upper part of the said plate which it tends to raise in order to uncover the said aperture, the chain being guided upon the pulleys 7. In the inoperative position, the sliding plate is held in the lower position by the following means. The said plate has at the bottom an apertured lug 8 cooperating with the stud 9, Fig. 3, secured to a locking bolt or tube 10; to the end of said tube extending upon the front face of the said board is secured the disc 11; at the other end of the tube are disposed the lugs 12 to which are attached the springs 13 which are attached at the other end to a tube 14 in which the tube 10 is slidable. In the tube 14 is a longitudinal slot 15, Figs. 3 and 4, affording passage for the stud 9; said tube is secured to the front face of the board by means of a suitable flange 16.

A camera 18 is mounted upon the rear of the board 1 by any suitable means such as the angle brackets 18, in such manner that the lens shall be coaxial with the aperture 4; the camera shutter is connected by the tube 20 to a rubber bulb 21 which is maintained by a support 22 against a stop-piece 23 secured to the rear face of the board; the said sliding plate has at the top a projection 24, which on the ascent of the said plate will compress the said bulb against the said stop-piece, thus setting off the shutter.

The sliding plate 3 also actuates a suitable illuminating device; the said plate is provided for example with a rod 25 having at the top a brush formed by the flexible strips 26 which are suitably spaced apart and are adapted to close an electric circuit between a contact piece 27 connected to one wire of the electric line and a contact piece 28 which is situated at an upper point and is secured to a curved rod 29 ending in a point which is disposed at a suitable distance from the bottom of a cup 30 which is connected to the other wire of the electric circuit and contains a charge of magnesium.

The operation is as follows:

When a projectile strikes the disc 11, the tube 10 recoils within the tube 14, and the stud 9 leaves the lug 8, thus releasing the sliding plate 3 which ascends under the action of the counterweight 5 and uncovers the lens 19. The rod 25 makes and breaks the contact between the pieces 27 and 28, and a spark is thus formed between the rod 29 and the cup 30 so as to ignite the magnesium; the strips 26 are so disposed that the circuit will be closed several times between the contact pieces 27 and 28, so as to avoid failures in case the spark should not be produced during the first contact. The ignition may also be effected by the use of an incandescent wire, or by like means.

The sliding plate 3 continues its motion and presses upon the bulb 21 in order to actuate the shutter which has been preliminarily set in position. The length of the rod 25 is adjustable, since it is mounted in the socket 31 which is secured to the sliding plate and comprises a set screw whereby the magnesium is ignited before the camera is put in action.

Figure 1:
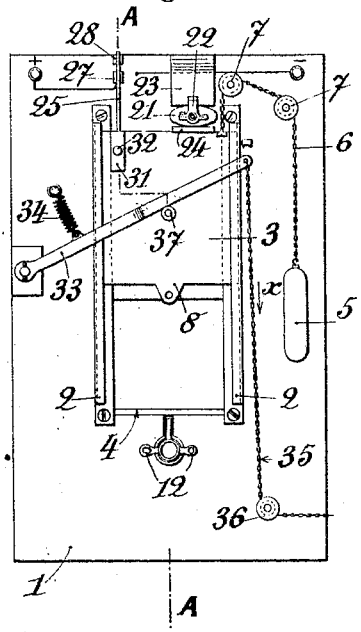
Fig. 1 is an elevational view of the arrangement observed from the rear, with the camera removed.
Figure 2:
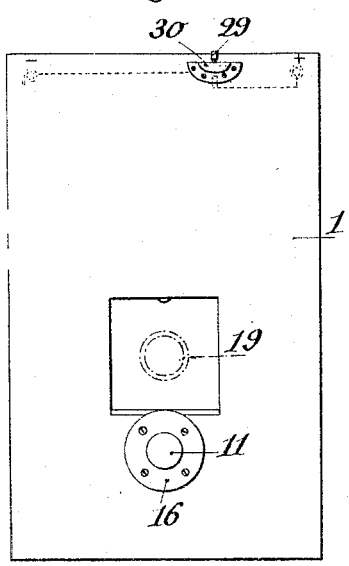
Fig. 2 is a corresponding front elevation.

In order to bring the said sliding plate to the initial position, a suitable distant control device may be provided, comprising for instance a lever 33 which is suitably bent and is pivoted to the rear face of the board, it being subjected to the action of a spring 34. The said lever is controlled by a chain 35 which is secured to one end of the lever and operates for instance upon a supporting pulley 36. To lower the sliding plate, one draws upon the chain in the direction of the arrow $x$, Fig. 1; the lever enters into contact with a roller 37 attached to the said plate, so that the latter will be lowered until it engages the stud 9, whereupon the lever 33 is allowed to resume the inoperative position, Fig. 1.

This engagement is facilitated from the fact that the stud 9 and the lug 8 each comprise inclined portions facilitating the sliding of one of these parts upon the other for purposes of engagement. When the sliding plate has been again lowered, all that is necessary is to renew the charge of magnesium, to set the camera shutter in position and to change the photographic plate or film, and the device is ready for a succeeding operation.

Obviously, the constructional forms and the arrangement of the several elements are susceptible of all suitable modifications without departing from the principle of the invention, which latter consists in the fact of operating a photographic camera by means of the impact of the projectile upon a given point, at the same time producing an artificial illumination by which the skillful shooter will be photographed.

It is obvious that the said camera may be mounted in any suitable position, so that the shooter may be photographed from the side instead of from the front; in this event it will be an easy matter to provide adequate connections between the locking bolt mounted at the centre of the target and the camera situated at a distance, by any suitable means of transmission of an electrical, pneumatic or like character.

Having thus described my process and apparatus, what I claim as new therein, and my own invention, is:

1. In a game or attraction for shooting galleries installed in fairs or the like, the combination of a target, a photographic camera, and means connecting the said target to the said camera whereby the camera lens will be uncovered when the shooter makes a bull's-eye and the shooter will be thus automatically photographed.

2. In a game or attraction for shooting galleries installed in fairs or the like, the combination of a target, a photographic camera, a ratchet device receiving the impact of the projectile, a sliding plate adapted to be released by the said ratchet device and having in the rear thereof the lens of the said camera, said lens being thereby uncovered when the shooter makes a bull's-eye.

3. In a game or attraction for shooting galleries installed in fairs or the like, the combination of a target, a photographic camera, a ratchet device receiving the impact of the projectile, a sliding plate adapted to be released by the said ratchet device and having in the rear thereof the lens of the said camera, means cooperating with the said sliding plate for the production of an electric spark, a charge of magnesium adapted to be ignited by the said spark, and means connecting the said sliding plate to the lens of the said camera.

4. In a game or attraction for shooting galleries installed in fairs or the like, the combination of a target, a photographic camera, a board having therein an aperture and upon which the said target is disposed, two guides disposed upon the rear face of the said board with reference to the shooter, a plate slidable in the said guides and adapted to close the aperture in the said board, a counterweight connected to the said sliding plate and adapted to displace the said plate, thus uncovering the camera lens and taking the photograph of the shooter when the latter makes a bull's-eye.

5. In a game or attraction for shooting galleries installed in fairs or the like, the combination of a target, a photographic camera, a board having therein an aperture and upon which the said target is disposed, two guides disposed upon the rear face of the said board with reference to the shooter, a plate slidable in the said guides and adapted to close the aperture in the said board, means for displacing the said plate in order to uncover the said aperture as well as the lens of the said camera, a lug secured to the lower part of the said sliding plate, and having an aperture therein, a stud engaging the said aperture, a locking bolt upon which the said stud is mounted, one end of the said bolt being adapted to extend upon the front face of the said board, and a disc secured to this outer end of the bolt and forming part of the target.

6. In a game or attraction for shooting galleries installed in fairs or the like, the combination of a target, a photographic camera, a board having therein an aperture and upon which the said target is disposed, a plate slidable upon the rear face of the said board with reference to the shooter and adapted to close the aperture in the said board as well as the lens of the said camera, a rubber bulb for actuating the camera shutter, means connecting said bulb with the said shutter, a stop-piece mounted upon the rear face of the said board, a support maintaining the said bulb against the said stop-piece, and a projection disposed upon the said sliding plate and adapted to compress the said bulb against the said stop-piece upon the ascent of the said sliding plate, thereby releasing the shutter of the said camera.

7. In a game or attraction for shooting galleries installed in fairs or the like, the combination of a target, a photographic camera, a board having therein in aperture and upon which the said target is disposed, a plate slidable upon the rear face of the said board with reference to the shooter and adapted to close the aperture in the said board as well as the lens of the said camera, a rod disposed upon the said sliding plate, flexible strips mounted upon the said rod and adapted to close an electric circuit between two contact pieces whereof one is connected to one of the current wires, a curved rod carrying the second contact piece and ending in a point, a cup connected to the second current wire and adapted to receive a charge of magnesium, said point being situated at a suitable distance from the bottom of the said cup.

In testimony that I claim the foregoing as my invention, I have signed my name in presence of a subscribing witness.

ANGE GIACOBI.

Witness:
MAURICE ROWE.